May 6, 1958 R. S. DICKS 2,833,699
CATALYST STRIPPING PROCESS
Filed Aug. 10, 1953 4 Sheets-Sheet 3
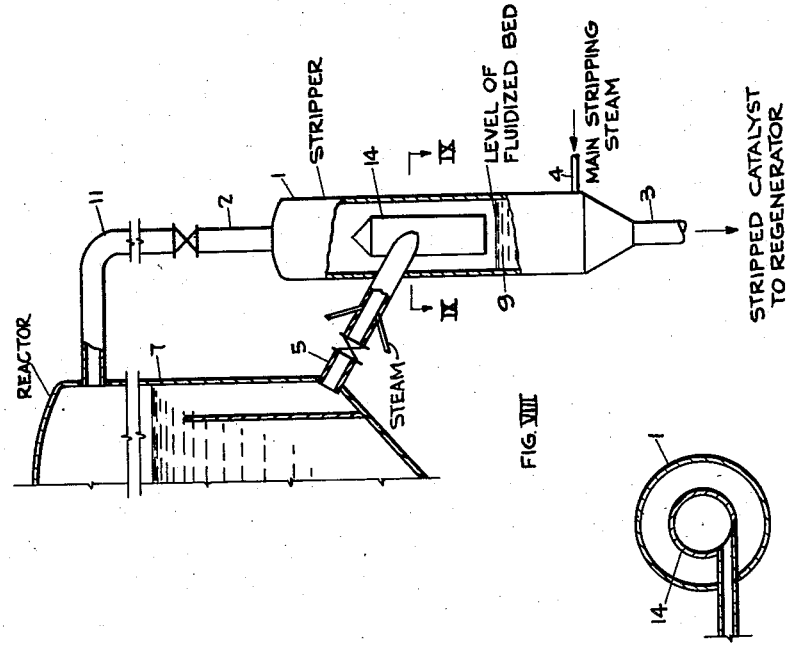
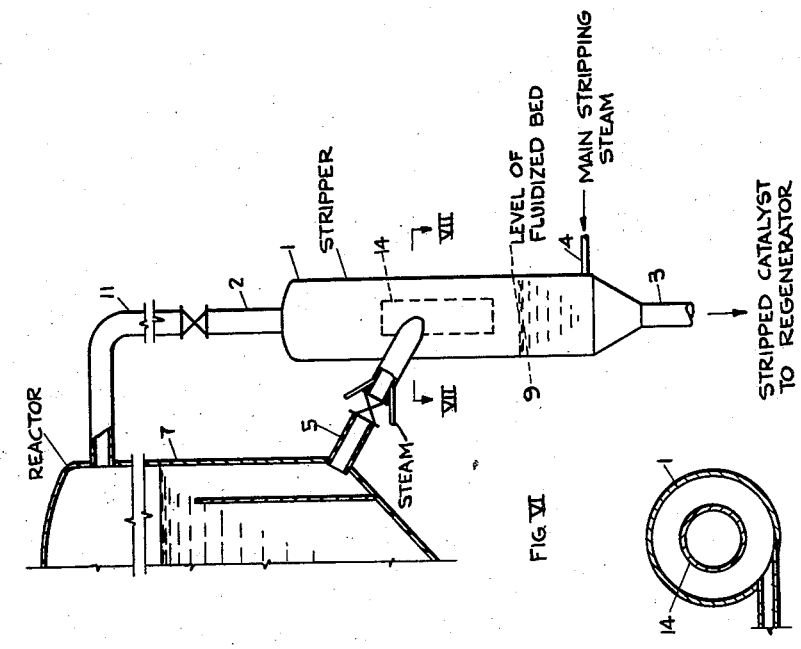
Inventor Robert S. Dicks
By: *James Todorovic*
His Attorney May 6, 1958 R. S. DICKS 2,833,699
CATALYST STRIPPING PROCESS
Filed Aug. 10, 1953 4 Sheets-Sheet 4
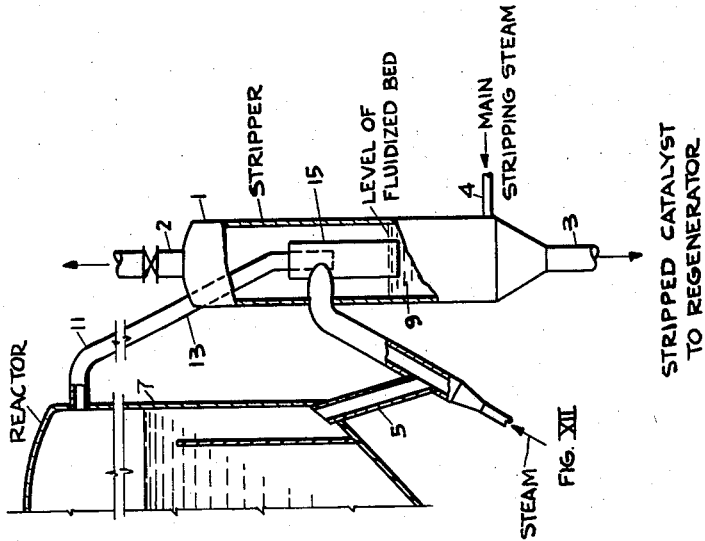
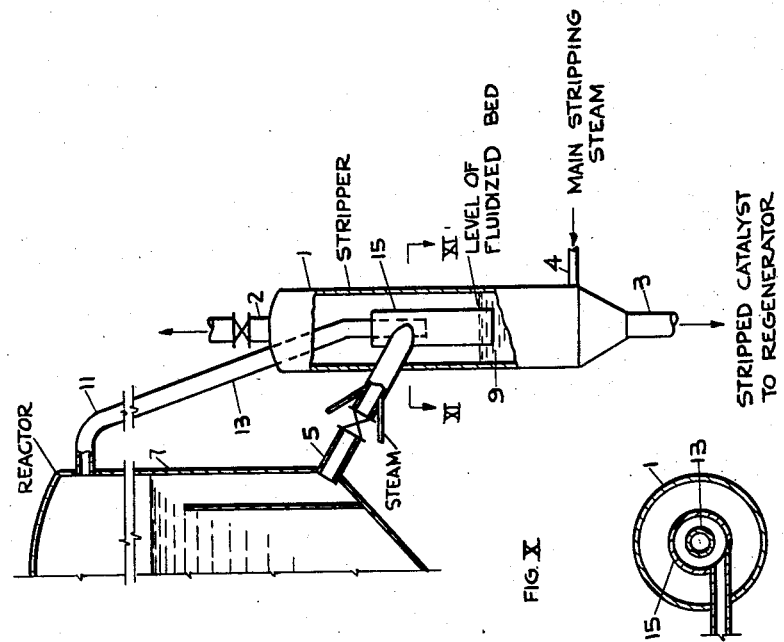
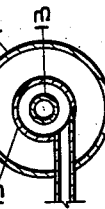
Inventor Robert S. Dicks
By: James Todorovic
His Attorney United States Patent Office 2,833,699
Patented May 6, 1958

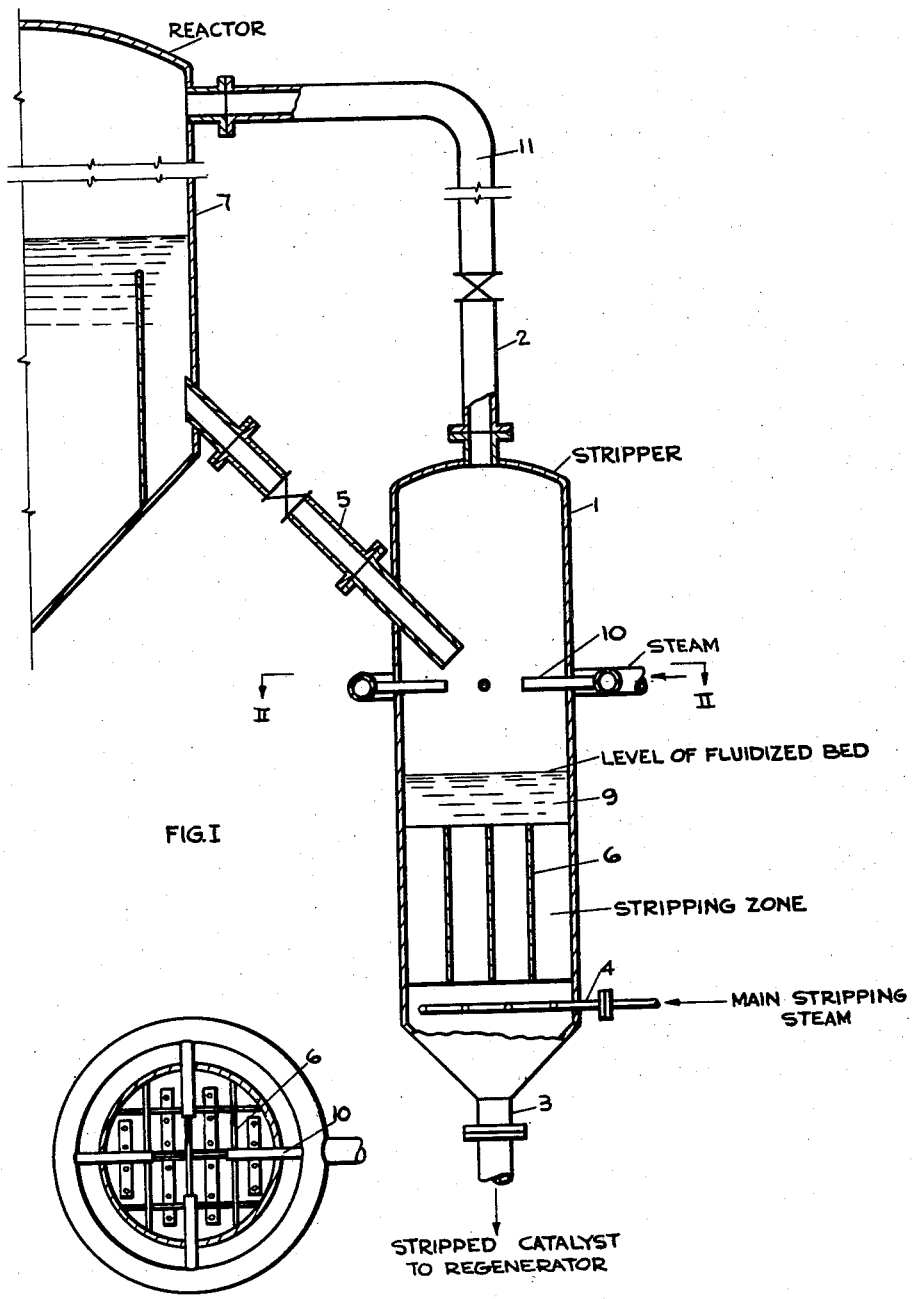

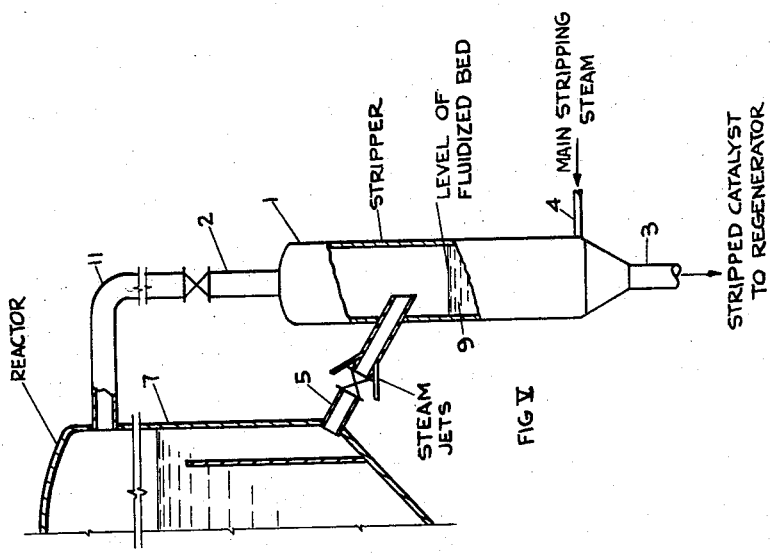
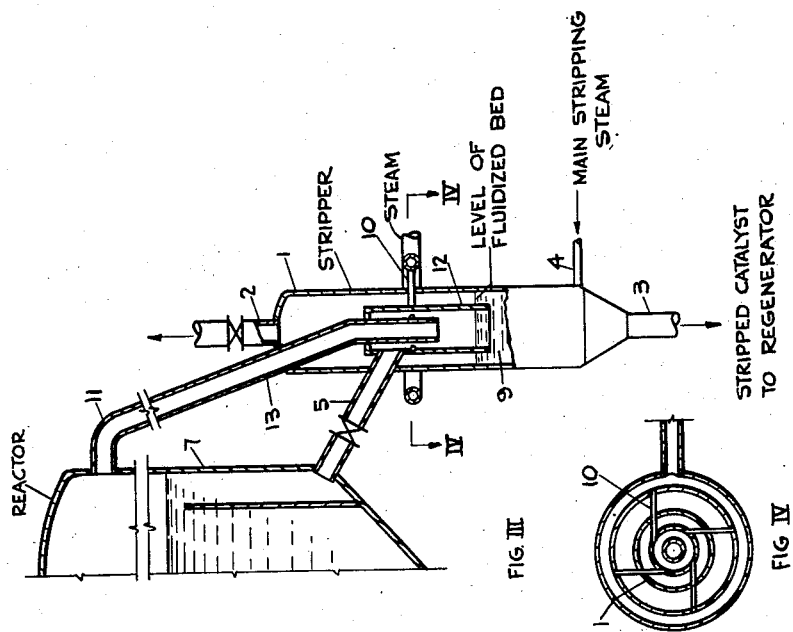
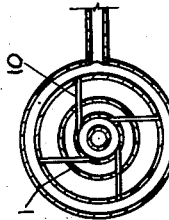

2,833,699

CATALYST STRIPPING PROCESS

Robert S. Dicks, Charlotte, N. C., assignor to Shell Development Company, Emeryville, Calif., a corporation of Delaware Application August 10, 1953, Serial No. 373,306

7 Claims. (Cl. 196—52)

This invention relates to the so-called stripping of spent powdered hydrocarbon conversion catalyst prior to regenerating it by burning off carbonaceous deposits, and to apparatus therefor.

In the conversion of hydrocarbon oils with powdered catalyst at elevated temperatures using the fluidized catalyst technique, e. g., in the fluidized catalyst catalytic cracking process, the finely divided solid catalyst is contacted with vapors of hydrocarbon oil under conversion conditions in a reactor and the spent catalyst contaminated with carbonaceous deposits is regenerated by burning off the carbonaceous deposits in a separate regenerator. The regenerated catalyst is then recycled back to the reactor. One of the characteristic advantages of this system is that the powdered catalyst acts as a heat carrier. Thus, substantially all of the heat required in the reactor is supplied with the hot regenerated catalyst cycled thereto. In order to supply the heat, very substantial amounts of catalyst must be recirculated through the two vessels. Thus, at least 4 and as much as 20 parts by weight of catalyst are generally cycled per part of oil treated.

The catalyst used in such processes is invariably one having a highly porous structure. In general the volume of the pores in the catalyst is about ½ the volume of the particles. It is apparent, therefore, that the large amount of catalyst cycled from the reactor to the regenerator will tend to carry with it a large amount of the hydrocarbon oil which would be burned in the regeneration step. This would represent a considerable loss of hydrocarbon oil and in addition would increase the cost and complication of the regeneration considerably. This tendency cannot be completely avoided but is overcome to some extent by subjecting the spent catalyst to a so-called stripping treatment prior to introducing it into the regeneration zone. In the stripping treatment a stripping gas is passed up through the spent catalyst to volatilize and remove as much as practical of the hydrocarbon material carried with the catalyst. Various inert gases such as carbon dioxide, nitrogen, flue gas, and the like have been suggested for use as the stripping gas but for several reasons steam is the most practical stripping gas and is used in commercial operation. In commercial operation, the amount of steam applied is generally around 400–500 pounds/minute/square foot of cross-sectional area of the stripping zone.

Various arrangements of the apparatus have been suggested for carrying out the process and such arrangements include means for this stripping operation. For several reasons the systems employing a downflow or bottom drawoff reactor are preferred to those employing an upflow or top drawoff reactor and such downflow reactors are used in commercial practice. In the downflow type of reactor the spent catalyst withdrawn from the reaction zone for cycling to the regeneration zone is withdrawn by gravity as a stream of relatively dense fluidized catalyst. The stripping of this catalyst is generally effected in a lower partially separated zone in the reactor vessel; however, arrangements with a separate stripping vessel (so-called side stripper) are also known.

Although the stripping step is recognized to be a very important step in the overall process and, although some experimental work has been done in attempts to improve this important step, little is known about the fundamentals of the operation. In view of the scarcity of suitable data, various aspects of the stripping operation were studied in a side stripper attached to a commercial catalytic cracking plant and arranged to allow controlled variations of the more important variables involved. As a result of this study, it has been discovered that the stripping efficiency can be materially improved in a very simple manner while at the same time achieving certain other advantages.

The amount and character of the carbonaceous material in the spent catalyst depend upon the character of the oil treated and the conditions in the reaction zone. All of the hydrocarbon material carried with the spent catalyst cannot be removed, regardless of the severity and efficiency of the stripping operation. A reliable means of estimating the degree of stripping may be had by sampling and analyzing the catalyst entering and leaving the stripping zone, and also analyzing a portion of the entering catalyst after subjecting it to a drastic steaming under a standardized set of conditions in a laboratory operation. This laboratory stripping operation is designed to remove all of the material which is capable of being removed by steaming at the stripping temperature, leaving a so-called unstrippable residue. By comparing the amount of hydrocarbon material removed in a given stripping operation with the maximum possible removal shown in the standard laboratory test, a measure of the degree of stripping is obtained. The degree of stripping generally increases as the stripping temperature is increased; the degree of stripping increases with increasing residence time of the catalyst in the stripping zone and as the amount of stripping gas is increased. Thus, although a certain amount of unstrippable carbonaceous material remains, regardless of the severity of the stripping treatment applied, any degree of stripping up to the maximum possible removal of strippable matter may be obtained by suitable increase in one or more of the above-mentioned factors.

The efficiency of the stripping operation is, however, not dependent only on the degree of removal of strippable material. In order to evaluate the stripping efficiency, it is necessary to consider the degree of removal of strippable matter with respect to the temperature, residence time in the stripping zone, and amount of stripping steam applied.

The catalyst circulated through the reaction zone, stripping zone, and regeneration zone gradually loses surface and activity. While the conditions in all of these zones contribute somewhat toward the deactivation of the catalyst, it is found that the largest part of the deactivation takes place in the stripping zone even though this zone is generally at a lower temperature than either the reaction zone or regeneration zone. This is due to the fact that the partial pressure of steam in the stripping zone is considerably higher than in the other zones. In order to retain the rate of deactivation of the catalyst at a minimum, it is, therefore, desirable to minimize contact of the catalyst with steam. It is, therefore, desirable to effect the stripping in the stripping zone with the minimum amount of steam possible and with the shortest residence time possible.

It has been found that while the degree of stripping, as hitherto carried out, is generally more or less proportional to the amount of stripping steam applied, the method by which the steam is applied makes a significant difference in the stripping efficiency. The improvement of the present invention allows a decrease in the residence time or a decrease in the amount of steam required to produce any given degree of stripping.

It is well known that the amount of carbonaceous deposits produced in the catalytic cracking of hydrocarbon oils increases rapidly as the depth of cracking is increased. It is also known that at high depths of cracking the product gases tend to approach in composition those produced by thermal cracking, e. g., the concentration of methane increases. The incremental carbonaceous matter deposited on the catalyst as a result of increased depth of cracking is largely non-strippable. A comparison of the hydrocarbon gases produced in the catalytic cracking operation with those produced in the conventional stripping operation where the temperature in the stripping zone is the same as, or slightly lower, than in the reaction zone and where the residence time of the catalyst in the reactor is considerably greater than in the stripping zone shows that the two gases are of quite different composition. The stripping gases are rich in methane which indicates considerable cracking of adsorbed carbonaceous material. This is illustrated by the comparable methane contents obtained under typical different sets of conditions, and shown in the following table:

*Methane contents of hydrocarbon gases*

| Condition | A | B | C | D |
|---|---|---|---|---|
| Reactor Gas | 9.5 | 9.6 | 12.5 | 7.9 |
| Stripper Gas | 16.2 | 30.2 | 21.2 | 26.3 |

Thus, while conventional stripping removes considerable carbonaceous matter through a cracking mechanism, this mechanism leads to an increase in the unstrippable residue. This should be avoided.

On the other hand, some stripping takes place through displacement of adsorbed hydrocarbons by water vapor. The material so removed is removed without increase in the unstrippable residue. By using stripping apparatus such as illustrated in the attached drawing and varying the location and manner of injection of the stripping steam, we have found that considerably more efficient stripping can be obtained with relatively small amounts of steam provided that the spent fluidized catalyst entering the stripping zone is subjected to impact with high velocity steam and then immediately separated from the steam. The high degree of turbulence and dispersion produced by the high velocity steam and also the immediate separation of the catalyst from the vapors are important to the success of the method. Thus, for example, tests have shown that a short blasting of the spent catalyst with a jet of steam followed by rapid separation will remove 60–70% of the strippable material. This is equivalent as far as removal of carbonaceous material is concerned, to stripping for 40 seconds under conventional conditions. It differs, however, in that the time is so short that cracking is not prominent and there is considerably less deactivation of the catalyst. The remaining 30–40% of strippable material is removed under conditions where cracking may take place. When properly carried out, this method not only effects more thorough removal of carbonaceous matter, but also allows the stripping to be carried out more efficiently with less damage to the catalyst.

The described improvement in the stripping is best obtained in a separate side stripping apparatus of special design in close proximity to and connected to a downflow fluidized catalyst reactor of somewhat higher elevation. Suitable arrangements are illustrated in the accompanying drawings.

Figures I and II illustrate a stripping apparatus in combination with a downflow catalytic reactor in which a portion of the steam is jetted into the dispersed phase of the stripping zone in such a manner that the incoming pseudo-liquid catalyst is subjected to a high velocity impact.

Figures III and IV illustrate a variation of the apparatus illustrated in Figures I and II in which more rapid separation following the velocity impact is achieved.

Figure V illustrates a stripping apparatus of the first type in which high velocity steam is jetted into the transfer line near its end and immediately below the control valve.

Figures VI and VII illustrate an apparatus similar in principle to that illustrated in Figure V but affording a more rapid separation of the catalyst from the secondary steam.

Figures VIII and IX illustrate another modification of the apparatus of Figure V wherein an even more rapid separation of the secondary steam is effected and an improved flow pattern is afforded in the stripping zone.

Figures X and XI illustrate a modification of the apparatus of Figure V which has certain additional advantages.

Figure XII illustrates a variation of the apparatus shown in Figures X and XI which allows certain advantages in certain cases.

For simplicity the similar parts are given the same reference number in each of the apparatus illustrated. Thus, the apparatus comprises the stripping vessel 1, conduit 2, a lower catalyst discharge conduit 3, means 4 for injecting primary or main stripping steam near the bottom, and an inlet conduit 5 for introducing the spent catalyst to be stripped. Line 5 connects with a fluid catalyst reactor 7 containing a bed of fluidized catalyst. The bottom of the stripping vessel is preferably provided with baffles or partitions 6 which divide this section into a number of parallel open-ended cells.

The stripping vessel is in combination with a fluidized catalyst reactor 7. It is preferably in close proximity to the reactor and is at a somewhat lower elevation so that transfer of catalyst from the reactor to the stripper takes place by gravity flow of pseudo liquid catalyst directly from the fluidized bed in the reactor. This dense phase transfer minimizes the transfer of hydrocarbon vapors. The transfer line 5 thus slopes downward and is provided with a suitable valve for controlling the flow of catalyst into the stripper.

In the apparatus illustrated in Figures I and II the inlet conduit 5 enters at about the mid-height of the vessel and above the level of the fluidized bed 9 of catalyst being stripped. Immediately below the end of the conduit 5 a plurality of horizontally disposed steam jets 10 are arranged to impinge upon the incoming stream of catalyst and upon each other. In operation the spent catalyst is withdrawn by gravity from the reactor as a stream of fluidized catalyst and, upon issuing from the conduit 5, it is immediately dispersed by the impinging jets of steam. The catalyst particles then fall and collect in the fluidized bed 9 wherein they are stripped by the passage of the primary steam introduced at the bottom. The vapors issue from the apparatus by line 2 at the top and are preferably returned to the disengaging zone of the reactor by line 11. The level of the fluidized catalyst undergoing stripping is retained appreciably below the discharge end of conduit 5. The stripped catalyst is withdrawn from the bottom of the vessel by line 3 to retain the desired catalyst bed level.

The apparatus illustrated in Figures III and IV differs in that a cylinder 12, open at the bottom, is suspended by means not shown in such a way that the bottom end dips into the fluidized bed of catalyst being stripped. An exit conduit 13 passes centrally down through the top closure of the cylinder to an intermediate height above the level of the fluidized bed. The inlet line 5 passes through the outer shell of the stripping vessel and discharges tangentially near the top of the inner cylinder 12 above the end of the discharge line 13. The steam jets 10 discharge into the inner cylinder 12 tangentially at a level above the end of the discharge line 13.

In the operation of this apparatus, the steam jets rapidly disperse the incoming spent catalyst while imparting a rotating motion thereto within the cylinder 12. The rotating motion causes the catalyst to pass quickly to the walls of the cylinder and thence down to the fluidized bed. The gases pass up through the discharge line 13 which in this case connects with the disengaging space in the reactor. The main stripping gas discharged by line 2 may be discarded. This arrangement has the advantage of materially decreasing the amount of gas discharged into the disengaging space in the reactor and, at the same time, introducing the spent catalyst near the center of the stripping vessel which is desirable since it tends to counteract the normal tendency for the catalyst to circulate upwardly near the center in the fluidized bed.

In the apparatus illustrated in Figure V, secondary steam is injected at a high velocity in the direction of catalyst flow in the transfer line 5. The velocity impact and dispersion of the catalyst, therefore, takes place in the transfer line near the end thereof. There is, therefore, only a very short contact before the stream enters the vessel 1 and the catalyst is separated.

Figures VI and VII illustrate a modification of the apparatus of Figure V. In this modification the transfer line enters the stripping vessel tangentially and a dummy cylinder 14 open at both ends is supported by means not shown in the stripping vessel opposite the end of the transfer line and above the bed of fluidized catalyst.

Another arrangement is illustrated in Figures VIII and IX. In this arrangement the transfer line passes through the wall of the stripping vessel and discharges tangentially into the inner cylinder 14 which is closed at the top and open at the bottom. In this arrangement, the catalyst is caused to enter the fluidized bed near its center.

In most cases, it is not desired to pass a large volume of the stripping gas to the disengaging space in the reactor. Figures X and XI illustrate an arrangement wherein this may be avoided while injecting the secondary steam in line 5. This modification is similar to that illustrated in Figures VIII and IX but differs therefrom in that the inner cylinder 15 is arranged like cylinder 12 of the apparatus shown in Figures III and IV. The secondary steam is withdrawn by line 13 and is passed to the disengaging space in the reactor and the primary steam is separately withdrawn by line 2.

Figure XII illustrates a modification of the arrangement illustrated in Figures X and XI which has the advantage of allowing the stripping vessel to be placed at a somewhat higher elevation. This is advantageous in that it simplifies the transportation of the stripped catalyst to the regenerator and, therefore, allows a better placing of the reactor and regenerator vessels to achieve the necessary overall circulation of the large amounts of catalyst involved. An additional advantage of the arrangement illustrated in Figure XII is that the flow of catalyst from the reactor to the stripper vessel may be regulated without the use of a valve in line 5. Thus line 5 is either vertical or inclined as illustrated and joins an uprising conduit at its lower extremity. The secondary steam is injected into the short riser line at the junction and the resulting dilute suspension passes upward to the inner cylinder 15. By controlling the amount of secondary steam injected, the rate of catalyst flow may be controlled.

It will be evident from the description of the illustrated arrangements that the contact between the spent catalyst and the secondary steam is very short, e. g., not more than two or three seconds.

In order to obtain the advantages of the described invention, it is essential that secondary steam be applied in an amount and at a velocity sufficient to effect rapid and thorough dispersion and agitation of the catalyst. This requires a high velocity impact. However, except for this requirement, the minimum amount of secondary steam is employed. The amount of secondary steam is, therefore, only a fraction (e. g., not more than five pounds per ton of catalyst) of the amount of primary steam supplied to the stripping zone and the total amount of steam required is less than that required for a given degree of stripping when all of the steam is passed up through the fluidized bed of catalyst being stripped.

It is claimed:

1. In the stripping of a powdered hydrocarbon conversion catalyst prior to regeneration of the catalyst by burning off carbonaceous deposits and wherein the contaminated catalyst is transferred in a pseudo liquid condition by gravity flow from a hydrocarbon conversion zone to a separate stripping zone, the improvement which comprises blasting the pseudo liquid catalyst entering said stripping zone with a jet of steam to thoroughly disperse the catalyst, immediately separating the dispersed catalyst from the resulting mixture of steam and hydrocaron, immediately withdrawing the mixture of steam and hydrocarbon from said stripping zone out of contact with the catalyst, collecting the separated catalyst in a pseudo liquid bed, and passing other steam up through the pseudo liquid bed thereby to further strip the catalyst of hydrocarbon constituents.

2. In the stripping of a powdered cracking catalyst prior to the regeneration of the catalyst by burning carbonaceous deposits therefrom and wherein the contaminated catalyst to be stripped is transferred from the catalytic reactor in a pseudo liquid condition, the improvement which comprises thoroughly dispersing the spent catalyst with jets of steam upon entering the stripping zone, immediately separating the dispersed catalyst from the resulting mixture of steam and stripped hydrocarbon, immediately removing the mixture of steam+stripped hydrocarbon, from contact with catalyst, collecting the separated catalyst in a pseudo liquid bed below the point of entry of the spent catalyst into said stripping zone, and passing a separate portion of steam up through said pseudo liquid bed to thereby further strip the catalyst of hydrocarbon constituents.

3. The process according to claim 2 further characterized in that the said mixture of steam+stripped hydrocarbons is removed from said stripping zone separately from the mixture of steam+stripped hydrocarbons resulting from the passage of said second portion of steam through the pseudo liquid bed of catalyst.

4. A fluid catalyst stripper comprising a cylindrical stripping vessel, a stripping gas exit line extending from the top of said cylindrical vessel, a stripped catalyst discharge conduit extending downward from the bottom of said stripping vessel, means for injecting and distributing stripping steam into said cylindrical vessel near the bottom thereof, a downwardly sloping catalyst supply conduit entering said cylindrical vessel at about the mid-height thereof, a control valve in said catalyst supply conduit for controlling the flow of spent catalyst into said stripping vessel, and means for injecting steam in a downward direction into said supply conduit immediately downstream of said control valve.

5. A fluid catalyst stripper comprising a first cylindrical stripping vessel, a second cylindrical vessel closed at the top and open at the bottom axially mounted within said first cylindrical vessel at about the mid-height thereof, a downwardly sloping catalyst supply conduit entering said first cylindrical vessel at about the mid-height thereof tangentially and opposite the mid-height of said second cylindrical vessel, a control valve in said catalyst supply conduit, means for injecting steam in a downward direction to said catalyst supply conduit immediately downstream of said control valve, a stripping gas exit line extending upward from the top of said first cylindrical vessel, a stripped catalyst discharge conduit extending downwardly from the first said cylindrical vessel, and means for injecting and distributing stripping steam into said first cylindrical vessel near the bottom thereof.

6. A fluid catalyst stripper comprising a first cylindrical vessel, a second cylindrical vessel closed at the top and open at the bottom axially mounted in said first cylindrical vessel at about the mid-height thereof, a catalyst supply conduit passing through the wall of said first cylindrical vessel and entering said second cylindrical vessel tangentially near the top thereof, a vapor discharge line at the top of said first cylindrical vessel, a separate vapor discharge line passing through both cylindrical vessels and extending from a point near the middle of said second cylindrical vessel, a control valve in said catalyst supply conduit, means for injecting steam in a downward direction to said supply conduit immediately downstream of said control valve, a stripped catalyst discharge conduit extending downward from the first said cylindrical vessel, and means for injecting and distributing stripping steam in said first cylindrical vessel near the bottom thereof.

7. A fluidized catalyst stripper comprising a first cylindrical vessel, a second cylindrical vessel closed at the top and open at the bottom axially mounted in said first cylindrical vessel at about the mid-height thereof, a catalyst supply conduit passing through the wall of said first cylindrical vessel and entering said second cylindrical vessel tangentially near the top thereof, a vapor discharge line at the top of said first cylindrical vessel, a separate second discharge line extending from a point near the middle of said second cylindrical vessel through the top thereof and through the top of said first cylindrical vessel, and means for injecting jets of steam in a tangential direction within the second cylindrical vessel near the discharge end of said catalyst supply conduit.

References Cited in the file of this patent

UNITED STATES PATENTS

| | | |
|---|---|---|
| 2,419,323 | Meinert et al. | Apr. 22, 1947 |
| 2,440,620 | Taff | Apr. 27, 1948 |
| 2,526,881 | Kunreuther et al. | Oct. 24, 1950 |
| 2,541,801 | Wilcox | Feb. 13, 1951 |
| 2,585,238 | Gerhold | Feb. 12, 1952 |
| 2,587,554 | Weikart | Feb. 26, 1952 |